(12) United States Patent
Lasdon

(10) Patent No.: US 7,169,431 B2
(45) Date of Patent: Jan. 30, 2007

(54) LOW FAT PEANUT BUTTER-LIKE PRODUCT MADE WITH TAPIOCA SYRUP

(76) Inventor: Stuart Lasdon, 30 Blank La., Watermill, NY (US) 11976

(*) Notice: Subject to any disclaimer, the term of this patent is extended or adjusted under 35 U.S.C. 154(b) by 363 days.

(21) Appl. No.: 10/426,087

(22) Filed: Apr. 29, 2003

(65) Prior Publication Data

US 2004/0219285 A1    Nov. 4, 2004

(51) Int. Cl.
*A23L 1/38*    (2006.01)
(52) U.S. Cl. .............. 426/633; 426/634; 426/658; 426/661
(58) Field of Classification Search ........... 426/633, 426/634, 658, 661
See application file for complete search history.

(56) References Cited

U.S. PATENT DOCUMENTS

| 1,189,128 A | 6/1916 | Kellogg |
| 3,947,599 A | 3/1976 | Mitchell, Jr. |
| 4,113,599 A | 9/1978 | Gillery |
| 4,828,868 A | 5/1989 | Lasdon et al. |
| 5,240,734 A | 8/1993 | Izzo et al. |
| 5,366,754 A | 11/1994 | Rudan et al. |
| 5,603,979 A * | 2/1997 | Lasdon et al. .............. 426/633 |
| 5,876,781 A | 3/1999 | Lasdon et al. |
| 6,136,366 A * | 10/2000 | Liedl et al. ................. 426/633 |

* cited by examiner

*Primary Examiner*—Helen Pratt
(74) *Attorney, Agent, or Firm*—Norman E. Lehrer

(57) ABSTRACT

A water-based, low fat, low calorie peanut butter-like product is provided having a superior texture and mouth-feel that is shelf stable at room temperatures is disclosed. The peanut butter-like product includes water in an amount of about 20% by weight, tapioca syrup in an amount of about 25% by weight, rice syrup in an amount of about 15% by weight, glycerin in an amount of about 3% by weight, sugar in an amount of about 7% by weight, tapioca starch in an amount of about 2% by weight, soy protein in an amount of about 3% by weight, defatted peanut flour in an amount of about 15% by weight, peanut butter in an amount of about 7% by weight, peanut oils in an amount of about 2% by weight, and salt in an amount of about 1% by weight.

2 Claims, No Drawings

LOW FAT PEANUT BUTTER-LIKE PRODUCT MADE WITH TAPIOCA SYRUP

BACKGROUND OF THE INVENTION

The present invention is directed toward a low fat peanut butter-like product and more particularly, toward a low fat peanut butter-like product that is made using tapioca syrup.

Peanut butter is one of the most popular foods in American diet. It is enjoyed for its rich flavor and unique texture and mouth feel. While peanut butter is generally a healthy food, it is high in both fat and calories. A 32 gram portion of conventional peanut butter typically contains about 190 calories, at least 70 percent of which are from fat. For many people who are obese or who have medical problems, a low calorie, low fat diet is imperative. Further, it is well documented that most of the U.S. population consumes too much fat and many people who do not have medical problems nonetheless choose to reduce their fat intake.

Some reduced calorie and reduced fat peanut and peanut flour products have been created. In these products, calories are reduced by partially removing fats from the peanuts or peanut flours. Unfortunately, this means of caloric reduction sacrifices certain desirable sensory properties. For, example, the reduced fat peanut flours described in U.S. Pat. Nos. 4,113,599 and 3,947,599 are very bland and almost tasteless. Further, these products are typically dry, generally having a water content of under 5 percent by weight. As a consequence, the use of these products has been limited to base protein materials which are used in the production of other food products.

U.S. Pat. No. 4,828,868 ("the '868 patent") discloses a low fat (70–95% less fat than conventional peanut butter), low calorie peanut butter type product of processed defatted peanut flour and water (plus other ingredients). The product of the '868 patent is not shelf stable at room temperatures, however, and requires refrigeration during all stages of storage after packaging, both before and after opening.

Since consumers are accustomed to conventional peanut butter being marketed on unrefrigerated grocery shelves and being storable for an extended period at home without refrigeration, it is desirable from a marketing standpoint that a low fat, low calorie peanut butter-like product be similarly shelf stable at room temperatures.

The book, *Food Science*, by Norman N. Potter, Third Edition, A.V.I. (1984) describes the term "water activity level". Qualitatively, water activity is a measure of unbound, free water in a system that is available to support biological and chemical reactions. Since water activity is not the same as absolute water content, two foods with the same water content can have very different water activities. That is, the water activity level depends on the degree to which water is free or otherwise bound to food constituents. When a food is in moisture equilibrium with its environment, the water activity of the food will be quantitatively equal to the relative humidity in the head space of the container divided by 100.

In general, as the water activity ($A_w$) of a food product increases, its shelf life decreases. That is, the food product becomes more susceptible to mold, fungus, and bacterial growth as the water activity increases. The U.S. Food and Drug Administration defines a low acid food product with a pH of greater than 4.6 as "shelf stable" if it has a water activity of 0.85 or less. All of the products described in the '868 patent have water activities over 0.95 and usually over 0.97.

Moreover, besides requiring constant refrigeration (both before and after opening), the peanut butter-like products made in accordance with the '868 patent lack the rich taste and desirable mouth feel that typically characterize real peanut butter. This is due in part to the peanut ingredient disclosed in the '868 patent being defatted peanut flour. Defatted peanut flours are relatively bland and deliver limited peanut flavor.

In order to improve the flavor and mouth feel of the peanut butter-like products made in accordance with the '868 patent, natural peanut butter was added to the product in quantities sufficient to increase the sensory qualities but to still permit the product as a "low fat product". This proved to be unacceptable as the addition of conventional peanut butter to the product having a water activity in excess of 0.95 resulted in the rapid deterioration of the flavor and texture of the product.

Recently, there have been developed reduced fat peanut butter-like products containing 10%–30% less fat than conventional peanut butter and middle range peanut butter-like products containing 30%–50% less fat than conventional peanut butter. Some of these products have relatively low water activities and thereby acceptable shelf stability. For example, U.S. Pat. No. 5,240,734 discloses such a reduced fat peanut butter-like composition that has a water activity which is satisfactory for shelf stability. The composition includes peanut butter in the amount of 50% by weight. Accordingly, while the composition has less fat than conventional peanut butter, it still does not approach the FDA requirements for a low fat product. Specifically, the FDA requires such a product to contain 3.0 or less grams of fat per 32 gram serving or at least 80–95% less fat than conventional peanut butter.

U.S. Pat. No. 5,366,754 is directed to a reduced fat peanut butter-like product and a method of making the same. This patent suggests that it provides a method for producing a peanut butter-like product that has a low fat content and a water activity of 0.91 after pasteurization. However, the peanut raw materials utilized to make this "low fat" product are not commercially available. Further, a water activity level of 0.91 reported for that product does not denote a shelf stable product according to U.S. FDA standards.

U.S. Pat. No. 5,876,781 discloses a water-based, low fat, peanut butter-like product that has a water activity level in the range of 0.75 to 0.85. This formulation, however, utilizes sugars and syrups which cause the product to have a high sugar content with consequent excessive and unpleasant sweet taste.

Therefore, a need exists for a peanut butter-like product that has reduced sugar content, reduced fat content, superior taste, and increased shelf stability.

SUMMARY OF THE INVENTION

The present invention is designed to overcome the deficiencies of the prior art discussed above. It is an object of the present invention to provide a peanut butter-like product with reduced sugar content but that does not compromise the taste of the product.

It is another object of the present invention to provide a peanut butter-like product that has increased shelf stability.

It is a further object of the present invention to provide a peanut butter-like product that uses tapioca syrup alone or with rice syrup.

In accordance with the illustrative embodiments demonstrating features and advantages of the present invention, there is provided a water-based, low fat, low calorie peanut butter-like product that includes water in an amount of about 20% by weight, tapioca syrup in an amount of about 25% by weight, rice syrup in an amount of about 15% by weight, glycerin in an amount of about 3% by weight, sugar in an amount of about 7% by weight, tapioca starch in an amount of about 2% by weight, soy protein in an amount of about 3% by weight, defatted peanut flour in an amount of about 15% by weight, peanut butter in an amount of about 7% by weight, peanut oils in an amount of about 2% by weight, and salt in an amount of about 1% by weight.

Other objects, features, and advantages of the invention will be readily apparent from the following detailed description of a preferred embodiment.

DETAILED DESCRIPTION OF THE PREFERRED EMBODIMENT

Conventional peanut butter consists of a mixture of finely ground roasted peanuts, sugar, salt and optionally, stabilizers. It is made by roasting and grinding peanuts. Conventional peanut butters possess a pleasing texture and mouthfeel. Stabilizers are typically added to prevent oil from separating.

In the following, the term "low fat peanut butter-like product" refers to a product which has 95% or less fat than conventional peanut butter and has a water activity of 0.820 or less.

In general, as the water activity of a food product increases, its shelf life decreases. That is, as the water activity increases, the product becomes more susceptible to mold, fungus, and bacterial growth. The U.S. Food and Drug Administration (FDA) has defined a low acid food product with a pH of greater than 4.6 as "shelf stable" if it has a water activity of 0.85 or less.

The water-based, low fat, low calorie peanut butter-like product of the present invention includes water in an amount of from about 1% to about 50% by weight, tapioca syrup in an amount of from about 1% to 50% by weight, rice syrup in an amount of from about 1% to 50% by weight, glycerin in an amount of from about 1% to 10% by weight, sugar in an amount of from about 1% to 10% by weight, tapioca starch in an amount of from about 1% to 10% by weight, soy protein in an amount of from about 1% to 20% by weight, defatted peanut flour in an amount of from about 5% to 50% by weight, peanut butter in an amount of from about 5% to 25% by weight; peanut oils in an amount of from about 1% to 10% by weight, and salt in an amount of from about 0% to 5% by weight.

The peanut butter-like product of the present invention may include water in an amount of about 20% by weight, tapioca syrup in an amount of about 25% by weight, rice syrup in an amount of about 15% by weight, glycerin in an amount of about 3% by weight, sugar in an amount of about 7% by weight, tapioca starch in an amount of about 2% by weight, soy protein in an amount of about 3% by weight, defatted peanut flour in an amount of about 15% by weight, peanut butter in an amount of about 7% by weight, peanut oils in an amount of about 2% by weight, and salt in an amount of about 1% by weight. This example is merely illustrative, and is not intended to limit the possible formulations within the scope of the present invention. For example, the present invention may also be made without the use of rice syrup.

The present invention reduces the sugar content which thereby lowers the excessive sweetness often found in previous formulas. The water activity of the present invention is lower than previous formulas which provides for a longer shelf life and a more stable product. Also, the present invention eliminates several ingredients used in many prior formulas, such as vegetable gums and expensive flavors and colors and is gluten-free.

The present invention avoids the use of grains, syrups made from grains, wheat, and therefore, gluten by using tapioca which is a derivative of the manioc root which is a tuber. The present invention offers consumers a gluten-free food, thereby avoiding any possible allergies to gluten.

The present invention may be embodied in other specific forms without departing from the spirit or essential attributes thereof and accordingly, reference should be made to the appended claims rather than to the foregoing specification as indicating the scope of the invention.

I claim:

1. A water-based, low fat, low calorie peanut butter-like product comprising: water in an amount of from about 1% to about 50% by weight, tapioca syrup in an amount of from about 1% to 50% by weight, rice syrup in an amount of from about 1% to 50% by weight, glycerin in an amount of from about 1% to 10% by weight, sugar in an amount of from about 1% to 10% by weight, tapioca starch in an amount of from about 1% to 10% by weight, soy protein in an amount of from about 1% to 20% by weight, defatted peanut flour in an amount of from about 5% to 50% by weight, peanut butter in an amount of from about 5% to 25% by weight; peanut oils in an amount of from about 1% to 10% by weight, and salt in an amount of from about 0% to 5% by weight, the peanut butter-like product having a water activity of no more than 0.820.

2. A water-based, low fat, low calorie peanut butter-like product comprising: water in an amount of about 20% by weight, tapioca syrup in an amount of about 25% by weight, rice syrup in an amount of about 15% by weight, glycerin in an amount of about 3% by weight, sugar in an amount of about 7% by weight, tapioca starch in an amount of about 2% by weight, soy protein in an amount of about 3% by weight, defatted peanut flour in an amount of about 15% by weight, peanut butter in an amount of about 7% by weight, peanut oils in an amount of about 2% by weight, and salt in an amount of about 1% by weight, the peanut butter-like product having a water activity of no more than 0.820.

* * * * *